United States Patent [19]

Piccolo et al.

[11] 4,014,977
[45] Mar. 29, 1977

[54] PROCESS FOR THE HYDROLYSIS OF TITANIUM SULPHATE SOLUTIONS

[75] Inventors: Luigi Piccolo; Antonio Paolinelli, both of Milan; Tullio Pellizzon, Paderno Dugnano, all of Italy

[73] Assignee: Societa' Italiana Resine S.I.R. S.p.A, Milan, Italy

[22] Filed: Apr. 21, 1976

[21] Appl. No.: 679,125

[30] Foreign Application Priority Data

Apr. 30, 1975 Italy .............................. 22878/75

[52] U.S. Cl. .................................. 423/85; 423/616
[51] Int. Cl.² ...................................... C01G 23/06
[58] Field of Search ............... 423/85, 615, 616; 106/300

[56] References Cited

UNITED STATES PATENTS

| | | | |
|---|---|---|---|
| 1,851,487 | 3/1932 | Blumenfeld | 423/616 |
| 2,062,134 | 11/1936 | Kubelka et al. | 423/616 |
| 2,319,824 | 5/1943 | Olson | 423/615 |
| 2,331,496 | 10/1943 | Olson | 423/616 |
| 2,344,265 | 3/1944 | Plechner et al. | 423/615 |
| 3,501,271 | 5/1970 | Twist et al. | 423/615 |
| 3,706,829 | 12/1972 | Solomka et al. | 423/615 |

*Primary Examiner*—O. R. Vertiz
*Assistant Examiner*—Brian E. Hearn
*Attorney, Agent, or Firm*—Sughrue, Rothwell, Mion, Zinn & Macpeak

[57] ABSTRACT

Titanium sulphate solutions obtained in the sulphate process from titaniferous materials are hydrolized by contacting at 88°–98° C water with a first titanium sulphate solution having a $TiO_2$ titer of 230–260 g/l and an acid factor of 1.75–1.85, adding at 88°–98° C to the mixture a second titanium sulphate solution having a $TiO_2$ titer of 230–260 g/l and an acid factor of 2.1–2.4 and heating the resulting mixture at boiling point. A volumetric ratio of from 3:100 to 12:100 is maintained between the first and the second solution.

12 Claims, No Drawings

PROCESS FOR THE HYDROLYSIS OF TITANIUM SULPHATE SOLUTIONS

The present invention relates to a process for the hydrolysis of the titanium sulphate solutions obtained in the so-called sulphate process from the reaction products of titaniferous materials with sulphuric acid.

As is known, titanium dioxide is widely produced on a commercial scale by means of the so-called "sulphate process", in which a titaniferous material, such as ilmenite or a titaniferous slag, is put into contact at elevated temperature with concentrated sulphuric acid so as to form a porous solid mass consisting essentially of ferric and ferrous sulphates and of titanium sulphate and also of variable amounts of unattacked material.

The porous solid mass is then dissolved in water, or in water acidified with sulphuric acid, giving rise to a solution of sulphates, and the ferric sulphate present in this solution is transformed into ferrous sulphate by addition to the solution of a reducing agent, usually iron in the form of powder, filings or scrap.

The resulting solution is clarified by treatment with flocculating agents and subsequent filtration so as to remove undissolved and suspended impurities.

The ferrous sulphate present in the solution is then for the most part separated by crystallization in its heptahydrate form ($FeSO_4 \cdot 7H_2O$) through cooling of the solution and subsequent filtration or centrifuging.

Generally, up to about 70% of the ferrous sulphate is removed by crystallization.

The residual solution, after concentration, is hydrolised, usually by dilution with water at elevated temperature, using the autonucleation or induced nucleation method, to transform the soluble titanium sulphate into insoluble titanium hydroxide.

After precipitation of the hydroxide, the latter is filtered, washed, supplied with suitable additives and subjected to calcination, so as to yield the titanium dioxide from which the finished product is obtained by means of milling and possible post-treatment.

The behaviour of titanium dioxide in its use as a pigment, especially its characteristics of hiding power and dispersibility, is known to depend mainly upon the properties of its elementary granules and more exactly upon the average diameter, the granulometric dispersion, the shape and the degree of subdivision is elementary granules.

The average diameter of the elementary granules of titanium dioxide is one of the factors which determine the application field of the pigment: e.g., in paintings it is preferable to use granules with an average diameter around 0.22 microns, whilst for resins, granules having an average diameter around 0.19 microns are preferred.

Granulometric dispersion should be as narrow as possible: generally, for use as pigments, the best results are achieved with elementary granules having a diameter not less than 0.15 microns and not more than 0.30 microns.

The particles should, moreover, be compact and deprived of uneven projections, and the degree of subdivision should be such as to avoid or at least reduce in number the granule aggregates.

It is known that in the preparation of titanium dioxide via sulphate the conditions under which hydrolysis of titanium sulphate is effected, exert a determinant influence upon the fundamental application characteristics of the final product.

More particularly, one of the most important parameters which exert an influence on the progress of the titanium sulphate hydrolysis, is the so called "acid factor" of the titanium sulphate solution, this term being intended as the weight ratio between the sum of the amount of free sulphuric acid and the amount of sulphuric acid combined as titanium sulphate ($TiOSO_4$) and the titanium content in the solution, expressed as $TiO_2$.

An acid factor of 1.8 is considered in the art as the optimal value for obtaining a final product with the optimal properties.

However, the characteristics of the titanium sulphate solutions are scarcely reproducible: more particularly, the acid factor strongly depends on the degree of initial attack of the titaniferous material by sulphuric acid, and, feed ratios between sulphuric acid and titaniferous material being equal, the lower has been the attack of the titaniferous material, the higher is the acid factor.

In practice, the acid factor fluctuates between 1.7 and 1.9 and often even within a wider range.

This thus implies that the results of the hydrolysis are different from one operation to another and that the characteristics of titanium dioxide, more particularly its particle size and granulometric distribution, are thereby different from one lot to another.

According to the art, final products with good pigment characteristics, measured as Reynolds reducing power, can only be obtained, other conditions being equal, by operating with acid factors very close to the optimal value, e.g. between 1.75 and 1.85.

In the preparation of titanium dioxide via sulphate, it is therefore particularly important to succeed in controlling the characteristics of the titanium sulphate solution, in addition, of course, to the conditions of the hydrolysis operations.

It has not been possible to date in the art to properly effect this control, and therefore the characteristics of the final product are not reproducible and vary from one lot to another.

Neither has a correction of the acid factor of the titanium sulphate solution, theoretically possible, been found to be possible in practice because of the difficulties encountered and also because of the fact that the results which are achieved after correction are still unsatisfactory.

A process for the hydrolysis of titanium sulphate solutions has now been found, whic makes it possible to overcome the drawbacks due to the fluctuations of the acid factor and to obtain a final titanium dioxide having constant and surprisingly improved characteristics.

Besides, it has been found, and this is the most surprising aspect of the invention, that improved results with respect to those obtainable with titanium sulphate solutions having an acid factor of 1.8, are obtained by means of the hydrolysis process of the invention, using titanium sulphate solutions having an acid factor decidedly higher than 1.8.

Thus, the invention provides a process for the hydrolysis of titanium sulphate solutions obtained in the sulphate process from the reaction products of titaniferous materials with sulfuric acid, characterized by (a) gradually bringing into contact a first solution of titanium sulphate (solution A), having a titer, expressed as $TiO_2$, of from 230 to 260 g/l and an acid factor of from 1.75 to 1.85, heated to a temperature of from 88° to 98° C, and water heated to a temperature of from 88° to 98° C, thus inducing the formation of hydrolysis nuclei by autonucleation;

(b) gradually adding a second solution of titanium sulphate (solution B) having a titer, expressed as $TiO_2$, of from 230 to 260 g/l and an acid factor of from 2.1 to 2.4, heated to a temperature of from 88° to 98° C, to the mixture obtained at stage (a), maintained at a temperature of from 88° to 98° C, while maintaining a volumetric ratio of from 3:100 to 12:100 between the solution A and the solution B and a volumetric ratio of from 3:1 to 5:1 between the sum of the solutions A and B and the water used at stage (a);

(c) heating the resulting mixture at boiling point, thereby to provoke the hydrolysis of the titanium sulphate added at stage (b) by induced nucleation by means of the hydrolysis nuclei obtained at stage (a).

Preferably, the solution A is heated to a temperature of from 93° to 96° C and then contacted with water at a temperature of from 93° to 96° C. The (solution A + solution B)/water volumetric ratio is preferably of from 3.5:1 to 4.5:1.

Contacting of the solution A with water is preferably carried out in a constant manner, in a period of from 0.5 to 1.5 minutes, and under stirring. In a preferred embodiment contacting is effected by gradual addition of the solution A, under the previously described conditions, to the heated water. This stage may also advantageously be carried out by gradually adding heated water to the solution A, provided that the required conditions are still respected as a whole.

The solution B is preferably heated at a temperature of from 93° to 96° C and is conveniently added to the resulting mixture immediately at the end of this stage.

The solution B is preferably added in a constant manner in a time of from 12 to 20 minutes. During feeding, the mass is conveniently maintained under stirring. At the end of stage (b), the mass is heated at boiling point, preferably under stirring, thus obtaining the formation of a titanium hydroxide precipitate by the induced nucleation method.

In a preferred embodiment, upon completion of the addition of the solution B, the mass is brought to boiling point under stirring and maintained under these conditions up to the beginning of the hydrolysis, shown by the first appearance of a white precipitate, and heating and stirring are then stopped. Heating and stirring are then started again, after a period of from 15 to 45 minutes, until the mass is again brought to boiling point and these conditions are maintained for a time of from 1 to 4 hours.

For the purpose of improving the hydrolysis yield, it is possible at this point to supply the mass with water at a temperature of from 88° to 98° C in an amount of from 10 to 20% in volume with respect to the volume of the mass and to maintain the whole at boiling point for a further period of from 1 to 4 hours.

The precipitate formed by hydrolysis is then separated, washed and submitted to the conventional operations of the known technique for producing titanium dioxide pigments.

Thus, before calcining and milling, the hydrolised product is submitted to the conventional operations of bleaching and of addition of rutilization nuclei and mineralizing agents.

According to an embodiment of the process of the present invention the solution A is produced from the solution B.

For this purpose, a small amount of solution B is treated to lower its acid factor to the value required for the solution A (from 1.75 to 1.85).

This may be easily carried out by addition of a substance capable of neutralizing the free sulphuric acid and which does not bring about the formation of undesired products. Ferric hydroxide is preferred for the purpose, but other substances, such as soda, caustic soda and ammonia, may also be used.

The advantages achieved by operating according to the process of the present invention, are numerous.

One of the most important consists in that the characteristics of the final product (in particular the average diameter of the particles and the granulometric dispersion parameter) are reproducible, and therefore no longer different from one lot to another.

Tis is certainly connected with the constant reproducibility of the hydrolysis conditions.

Moreover, the final titanium dioxide, in rutile form, in characterized by the lack of agglomerates and aggregates, by the regular shape of the particles and above all by a very uniform distribution of the size of said particles.

As a result, the final titanium dioxide has a higher covering power and, finally, decidedly improved pigment charcteristics.

Another important advantage of the process of the present invention consists in that the amount of solution A is an important means for regulating the size of the particles which can be adjusted according to the specific applications of the pigment.

Thus, the use of a small amount of solution A (usually from 3 to 4% with respect to the solution B) allows the obtaining of particles having an average diameter of 0.22–0.23 microns, suitable for use in paints, whereas the use of a higher amount (usually from 8 to 10% with respect to the solution B) allows the obtaining of particles having an average diameter of 0.19–0.20 microns suitable for use in resins and plastics materials in general.

The invention will now be illustrated by the following examples.

In the examples the covering power is measured by the Reynolds reducing power (described in Gardner-Sward Physical and Chemical Examination — Paints, Varnishes, Lacquers, Colours, 12th Edition (1962), pages 53–54).

EXAMPLE 1 (Comparative)

By attack of ilmenite of Australian origin with sulphuric acid, formation of an aqueous solution of sulphates, subsequent reduction with iron scraps, filtration and partial removal of the ferrous sulphate by crystallization, a titanium sulphate solution having the following chemical characteristics is prepared:

| | |
|---|---|
| content in tetravalent titanium, expressed as $TiO_2$: | 247 g/l |
| content in trivalent titanium, expressed as $TiO_2$: | 2.2 g.l |
| content in bivalent iron, expressed as $FeSO_4$: | 221 g/l |
| content in free sulphuric acid: | 146 g/l |

The acid factor of the solution is equal to 1.82.

Hydrolysis of this solution is carried out according to the known autonucleation technique.

Therefore, 2000 ml of this solution are heated to 95° C and poured in 16 minutes at a constant rate into 500 ml of water preheated to 95° C, maintaining the resulting mixture under stirring.

The mixture is then brought to boiling point. Heating and stirring are stopped at the beginning of the hydrolysis, shown by the first appearance of a white precipitate.

Stirring and heating are started again after 20 minutes and the solution is boiled for two hours; 250 ml of water heated to 95° C are added to the mass and the whole is boiled for a further two hours.

A hydrolysis yield of about 95.5% by weight is obtained.

The precipitated titanium hydroxide is then recovered by filtration and washed.

Bleaching operations, addition of rutilization nuclei and of mineralizing agents, calcining and grinding are then carried out according to the known art.

For this purpose the hydroxide is reduced to slurry by adding water in such an amount as to obtain a suspension of 300 g/l of $TiO_2$, to which are added zinc powder in an amount of 0.1% by weight with respect to $TiO_2$ and 98% sulphuric acid in an amount of 8% by weight with respect to the water.

The resulting mass is heated at 90° C for two hours. The suspension is cooled to 60° C and then supplied with rutilization nuclei, prepared according to the technique disclosed by U.S. Pat. No. 2,488,755, added in an amount of 4% by weight with respect to the titanium hydroxide, expressed as $TiO_2$; the temperature is maintained at 60° C for one further hour. The suspension is filtered and the residual gel is supplied with mineralizing agents consisting of zinc sulphate, potassium sulphate and aluminum sulphate, added respectively in an amount of 1.0, 0.4 and 0.05% by weight with respect to $TiO_2$.

Calcining is carried out in an oven at 880° C for three hours.

The calcined product is milled for a period of 5 hours in a porcelain ball-mill in an aqueous suspension having a concentration of 800 g of $TiO_2$ per litre.

A granular product having the following characteristics is obtained:

| | |
|---|---|
| average diameter of the particles: | 0.22 microns; |
| dispersion parameter of the particles: (defined as (d75-d25)/d50, wherein d75 is intended as the diameter under which 75% of the particles are present, etc.) | 0.56 |
| Reynolds reducing power: | 1725 |

EXAMPLE 2

A titanium sulphate solution having the same chemical characteristics as in Example 1, with the exception of the content in free sulphuric acid, and thus of the acid factor, is prepared.

More precisely, the characteristics of this solution (solution B) are the following:

| | |
|---|---|
| content in tetravalent titanium, expressed as $TiO_2$: | 247 g/l |
| content in trivalent titanium, expressed as $TiO_2$: | 2.2 g/l |
| content in bivalent iron, expressed as $FeSO_4$: | 221 g/l |
| content in free sulphuric acid: | 221 g/l. |

The acid factor of the solution is 2.12.

Unlike Example 1, the hydrolysis is carried out according to the process of the present invention.

Therefore, 60 ml of solution B are treated, for the purpose of correcting the acid factor, by adding ferrous hydroxide in an amount corresponding to 2.6 g of iron. The solution thus corrected, which is called solution A, has an acid factor of 1.81.

1940 ml of solution B and the solution A are separately heated to 95° C. The solution A is then poured at a constant rate in one minute under stirring into 500 ml of water preheated to 95° C. Immediately after this operation, the solution B is added at a constant rate in 15 minutes under agitation.

Upon completion of the addition of the solution B, the mass, still under agitation, is brought to boiling point and both heating and stirring are stopped at the beginning of the hydrolysis, shown by the first appearance of a white precipitate.

Stirring and heating are started again after 20 minutes and the solution is boiled for 2 hours. 250 ml of water heated to 95° C are then added and the whole is boiled for a further two hours.

A hydrolysis yield of about 95.5% by weight is obtained.

The precipitated titanium hydroxide is recovered by filtration and washed.

The titanium hydroxide is then proceessed into pigment according to the procedure described in Example 1.

The resulting product shows the following characteristics, which are remarkabls improved with respect to Example 1:

average particle diameter: 0.22 microns;
dispersion parameter of the particles, as defined in Example 1: 0.38;
Reynolds reducing power: 1825.

EXAMPLE 3

The test of Example 2 is repeated starting from a titanium sulphate solution having the same composition as that of Example 2, with the exception of the content in free sulphuric acid which is equal to 245 g/l and thus of the acid factor which is equal to 2.22.

60 ml of this solution (solution B) are treated, for the purpose of correcting the acid factor, by means of 2.22 g of ammonia, thus yielding a solution A with an acid factor of 1.79.

Hydrolysis is then carried out by accurately repeating the operation of Example 2, under the same conditions. The resulting product shows characteristics still improved with respect to those of Example 1 and more precisely:

| | |
|---|---|
| average particle diameter: | 0.22 microns; |
| dispersion parameter of the particles: | 0.42; |
| Reynolds reducing power: | 1800. |

EXAMPLE 4

The test of Example 2 is repeated starting from a titanium sulphate solution having the same composition as in Example 2, with the exception of the content in free sulphuric acid which is equal to 289 g/l and thus of the acid factor which is equal to 2.4.

60 ml of this solution (solution B) are treated for the purpose of correcting the acid factor, by means of 7.2 g of NaOH, thus obtaining a solution A with an acid factor of 1.8.

Hydrolysis and processing into pigment are then carried out by accurately repeating the operations of Example 2 under the same conditions.

The resulting product shows the following characteristics:

| | |
|---|---|
| average particle diameter: | 0.22 microns; |
| dispersion parameter of the particles: | 0.42; |
| Reynolds reducing power: | 1800. |

A comparison between the results of Examples 2, 3, and 4 shows that reproducible results are obtained when operating according to the process of the present invention, in spite of the fact that the starting solutions B have a perceptibly different acid factor, in contrast to what occurs in the conventional processes where small variations of the acid factor are sufficient to lead to non reproducible characteristics of the end product.

EXAMPLE 5

The titanium sulphate solution B of Example 2 is used with the same acid factor (2.12). 120 ml of this solution B are supplied with ferrous hydroxide added in an amount corresponding to 5.2 g of iron. A solution A, having an acid factor of 1.81, is thus obtained.

The solution A is heated to 95° C and poured at a constant rate in one minute under stirring into 500 ml of water preheated to 95° C.

Immediately after this operation, 1880 ml of solution B are added at 95° C at a constant rate, in 15 minutes under stirring.

The procedure and the conditions of Example 2 are then carefully followed.

The resulting product shows the following characteristics:

| | |
|---|---|
| average particle diameter: | 0.21 microns; |
| dispersion parameter of the particles: | 0.40; |
| Reynolds reducing power: | 1850. |

EXAMPLE 6

The titanium sulphate solution B of Example 2 is used with the same acid factor (2.12).

180 ml of this solution B are supplied with ferrous hydroxide added in an amount corresponding to 7.8 g of iron, thus obtaining a solution (solution A having an acid factor of 181.

The solution A is heated to 95° C and poured at a constant rate in one minute under stirring into 500 ml of water preheated at 95° C.

Immediately after this operation, 1820 ml of solution B at 95° C are added at a constant rate, in 15 minutes, under stirring.

The procedure of Example 2 is then carefully followed.

The resulting product shows the following characteristics:

| | |
|---|---|
| average particular diameter: | 0.19 microns; |
| dispersion parameter of the particles: | 0.38; |
| Reynolds reducing power: | 1850 |

A comparison between the results of Examples 2, 5 and 6 shows how it is possible, by operating according to the present invention, to impart to titanium dioxide the desired granulometric characteristics by varying the ratio of the solution A to the solution B.

We claim:

1. A method for the hydrolysis of titanium sulphate solutions obtained in the sulphate process from the reaction products of titaniferous materials with sulfuric acid, which comprises
   a. gradually bringing into contact a first solution of titanium sulphate, solution A, having a titer, expressed as $TiO_2$, of from 230 to 260 g/l and an acid factor of from 1.75 to 185, heated to a temperature of from 88° to 98° C, and water heated to a temperature of from 88° to 98° C, thus inducing the formation of hydrolysis nuclei by autonucleation;
   b. gradually adding a second solution of titanium sulphate, sodium B, having a titer, expressed as $TiO_2$, of from 230 to 260 g/l and an acid factor of from 2.1 to 2.4, heated to a temperature of from 88° to 98° C, to the mixture obtained at stage (a), maintained at a temperature of from 88° to 98° C, while maintaining a volumetric ratio of from 3:100 to 12:100 between the solution A and the solution B and a volumetric ratio of from 3:1 to 5:1 between the sum of the solutions A and B and the water used at stage (a);
   c. heating the resulting mixture at boiling point, thereby to provoke the hydrolysis of the titanium sulphate added at stage (b) by induced nucleation by means of the hydrolysis nuclei obtained at stage (a).

2. The method of claim 1, wherein the volumetric ratio between the sum of the solutions A and B and the water used at stage (a) is maintained at a value of from 3.5:1 to 4.5:1.

3. The method of claim 1, wherein said solution A, said solution B and said water are heated to a temperature of from 93° to 96° C.

4. The method of claim 1, wherein stage (a) is carried out under agitation in a period of from 0.5 to 1.5 minutes.

5. The method of claim 1, wherein stage (a) is carried out by adding said solution A to said water.

6. The method of claim 1, wherein stage (a) is carried out by adding said water to said solution A.

7. The method of claim 1, wherein said solution B is added to the mixture obtained at stage (a) immediately at the end of stage (a).

8. The method of claim 1, wherein stage (b) is carried out under agitation in a period of from 12 to 20 minutes.

9. The method of claim 1, wherein stage (c) is carried out by boiling under stirring the solution obtained at stage (b), up to the first appearance of a white precipitate, stopping then heating and stirring for a period of from 15 to 45 minutes, and boiling again under stirring said solution for a period of from 1 to 4 hours.

10. The method of claim 9, wherein the solution obtained at the end of stage (c) is supplied with water at a temperature of from 88° to 98° C, added in an amount of from 10 to 20% in volume with respect to the volume of said solution, and the resulting mixture is maintained at boiling point for a further period of from 1 to 4 hours.

11. The method of claim 1, wherein said solution A is produced from a titanium sulphate solution identical to said solution B by adding to the latter a substance capable of neutralizing the free sulphuric acid and which does not give rise to the formation of undesired compounds, in an amount such as to ensure the obtaining of an acid factor of from 1.75 to 1.85.

12. The method of claim 11, wherein said substance is selected from the group consisting of ferrous hydroxide, soda, caustic soda and ammonia.

* * * * *